United States Patent
Duerig et al.

(10) Patent No.: US 9,196,289 B2
(45) Date of Patent: *Nov. 24, 2015

(54) METHOD AND DEVICE FOR HIGH DENSITY DATA STORAGE

(71) Applicant: INTERNATIONAL BUSINESS MACHINES CORPORATION, Armonk, NY (US)

(72) Inventors: Urs T. Duerig, Rueschlikon (CH); Bernd W. Gotsmann, Rueschlikon (CH); Armin W. Knoll, Rueschlikon (CH); David S. Pires, Allschwil (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/244,099

(22) Filed: Apr. 3, 2014

(65) Prior Publication Data

US 2014/0301178 A1 Oct. 9, 2014

Related U.S. Application Data

(63) Continuation of application No. 13/124,310, filed as application No. PCT/IB2009/054536 on Oct. 15, 2009, now Pat. No. 8,715,804.

(30) Foreign Application Priority Data

Oct. 23, 2008 (EP) .................................. 08105633

(51) Int. Cl.
*G11B 7/24* (2013.01)
*G11B 9/14* (2006.01)
(Continued)

(52) U.S. Cl.
CPC ................. *G11B 9/149* (2013.01); *B82Y 10/00* (2013.01); *G11B 9/1472* (2013.01); *G11B 11/007* (2013.01); *Y10T 428/21* (2015.01);
(Continued)

(58) Field of Classification Search
CPC ....... G11B 7/245; G11B 9/149; G11B 11/007
See application file for complete search history.

(56) References Cited

U.S. PATENT DOCUMENTS

| | | |
|---|---|---|
| 5,125,138 A | 6/1992 | Shaw et al. |
| 5,733,663 A | 3/1998 | Scheunemann et al. |

(Continued)

FOREIGN PATENT DOCUMENTS

| | | |
|---|---|---|
| CN | 1200961 A | 12/1998 |
| JP | 7084839 A | 3/1995 |

(Continued)

OTHER PUBLICATIONS

A Scaling Theory of the Competition between Interdiffusion and Cross-Linking at Polymer Interfaces, http://arxiv.org/abs/cond-mat/0202477v1 pp. 4036-4043, vol. 35, 2002, Published in Macromolecules.

(Continued)

*Primary Examiner* — Elizabeth Mulvaney
(74) *Attorney, Agent, or Firm* — Griffiths & Seaton PLLC

(57) ABSTRACT

A local probe storage array is provided that includes a substrate, and a polymeric layer over the substrate, the polymeric layer comprising a crosslinking agent that has been cured, the crosslinking agent comprising at least three alkyne groups.

20 Claims, 8 Drawing Sheets

(51) Int. Cl.
*B82Y 10/00* (2011.01)
*G11B 11/00* (2006.01)

(52) U.S. Cl.
CPC .. *Y10T 428/24355* (2015.01); *Y10T 428/24612* (2015.01); *Y10T 428/265* (2015.01); *Y10T 428/31623* (2015.04); *Y10T 428/31721* (2015.04)

(56) References Cited

U.S. PATENT DOCUMENTS

| | | | |
|---|---|---|---|
| 6,045,864 | A | 4/2000 | Lyons et al. |
| 6,391,379 | B1 | 5/2002 | Lessner et al. |
| 6,811,829 | B2 | 11/2004 | Affinito et al. |
| 7,147,891 | B2 | 12/2006 | Bordunov et al. |
| 2002/0076506 | A1 | 6/2002 | Affinito et al. |
| 2005/0050258 | A1 | 3/2005 | Frommer et al. |
| 2008/0159114 | A1 | 7/2008 | DiPietro et al. |
| 2008/0161527 | A1 | 7/2008 | DiPietro et al. |
| 2008/0175139 | A1 | 7/2008 | DiPietro et al. |
| 2008/0220612 | A1 | 9/2008 | Drechsler et al. |

FOREIGN PATENT DOCUMENTS

| | | |
|---|---|---|
| JP | 200238080 A | 2/2002 |
| JP | 2009514126 A | 5/2004 |
| WO | 2007113760 A1 | 10/2007 |

OTHER PUBLICATIONS

Fabrication of Multi-Layered SiCN Ceramic MEMS using Photo-Polymerization of Precursor pp. 86-89, 2001, IEEE, 0-7 803-5997-4/01.

"Synthesis and Crystal Structure of 1,3,4-tris[4-(phenylethnyl)phenyl]benzene", Nov. 11, 1994, pp. 1873-1879, vol. 43, No. 11, Russian Chemical Bulletin.

Plastic Dictionary, Asakura Shoten, Inc., 1992, pp. 912-915, 926-933.

"Thermal and Dielectric Stability of Parylene X" 6 pages, vol. 914, 2006, Materials Research Society Symp. Proc.

Yan et al., "UV Induced Attachment of Ultrathin Polymer Films on Silicon Wafers" pp. 311-316, 2002, IEEE. 0-7803-7434-7/02.

METHOD AND DEVICE FOR HIGH DENSITY DATA STORAGE

CROSS-REFERENCE TO RELATED APPLICATIONS

This application is continuation of U.S. National-Stage application entry under 35 U.S.C. §371, Ser. No. 13/124,310, filed on Apr. 14, 2011, which was based on international Application No. PCT/IB2009/054536, filed Oct. 15, 2009, which was published under PCT Article 21(2) and which claims priority to European Patent Application No. 08105633.5, filed Oct. 23, 2008.

BACKGROUND OF THE INVENTION

1. Field of the Invention

The present invention relates to the field of high-density data storage and more specifically to a data storage medium, a data storage system, and a data storage method.

2. Description of Related Art

Current data storage methodologies operate in the 0.1-10 μm regime. In an effort to store ever more information in ever-smaller spaces, data storage density has been increasing. In an effort to reduce power consumption and increase the speed of operation of integrated circuits, the lithography used to fabricate integrated circuits is pressed toward smaller dimensions and denser imaging. As data storage size increases and density increases and integrated circuit densities increase, there is a developing need for compositions of matter for the storage media that operate in the nanometer regime.

A storage device for storing data based on the atomic force microscope (AFM) principle is disclosed in "The millipede—more than 1,000 tips for future AFM data storage" by P. Vettiger et al., IBM Journal Research Development, Vol. 44, No. 3, March 2000. The storage device has a read and write function based on a mechanical x-, y-scanning of a storage medium with an array of probes each having a tip. The probes operate in parallel with each probe scanning, during operation, an associated field of the storage medium. The storage medium comprises a polymer layer. The tips, which each have an apex diameter between 5 nm to 20 nm, are moved across the surface of the polymer layer in a contact mode. The contact mode is achieved by applying small forces to the probes so that the tips of the probes can touch the surface of the storage medium. For that purpose, the probes comprise cantilevers, which carry the tips on their end sections. Bits are represented by indentation marks or non-indentation marks in the polymer layer. The cantilevers respond to these topographic changes while they are moved across the surface of the polymer layer during operation of the device in read/write mode.

Indentation marks are formed on the polymer surface by thermomechanical recording. This is achieved by heating a respective probe operated in contact mode with respect to the polymer layer. Heating of the tip is achieved via a heater dedicated to the writing/formation of the indentation marks. The polymer layer softens locally where it is contacted by the heated tip. The result is an indentation, for example, having a nanoscale diameter of the tip that is used in its formation, being produced on the layer.

Reading is also accomplished by a thermomechanical concept. The probe is heated using a heater dedicated to the process of reading/sensing the indentation marks. Either a separate heater is used, which is not connected to the tip and therefore the probe is not heated or the probe is heated but not so as to cause heating of its associated tip, that is, the heating temperature is not high enough to soften the polymer layer as is necessary for writing. The thermal sensing is based on the fact that the thermal conductance between the probe and the storage medium changes when the probe is moving in an indentation as the heat transport is in this case more efficient. As a consequence of this, the temperature of the heater decreases and hence, also its electrical resistance changes. This change of resistance is then measured and serves as the measuring signal.

For such thermal probe storage applications, the media requirements are defined by the indentation mechanics of polymers and the need to limit media and tip layer. Preferably, the glass transition temperature should be minimized but the polymer should also be thermally stable. Thermal stability of polymers is achieved by crosslinking and using polymers with exceptional thermal stability. Crosslinking typically produces hard materials that require high forces to form indents and therefore lead to increased tip wear. With moderate write speeds, one may use higher temperatures to minimize forces and tip wear. Since the write temperature increases with the write speed, this trade-off between heat and force is not possible for fast writing which requires operation of the cantilever heater element at its maximum design temperature.

Accordingly, it is desirable to provide a method of producing a data storage medium which reconciles the conflicting requirements of high crosslink density for media wear resistance and low glass transition temperature for soft writing conditions.

SUMMARY OF THE INVENTION

According to a first aspect of the present invention, there is provided a method of producing a data storage medium on a surface of a substrate for storing data in the form of topographic features, comprising the steps of: (a) Deposition of a crosslinking agent on a surface of a substrate, said crosslinking agent containing at least three alkyne groups (i.e. containing at least three carbon-carbon triple bonds); (b) curing the deposited crosslinking agent, thereby producing a modified surface of the substrate, so as to obtain the data storage medium in the form of a crosslinked polymeric layer on the surface of the substrate.

According to the first aspect of the present invention, a layer of a crosslinking agent is deposited on the surface of a substrate. Simultaneous or subsequent to the deposition of the crosslinking agent, the deposited cross linking agent is cured thereby obtaining a layer containing cured crosslinking agent. This layer exhibits a high crosslink density. In one embodiment the substrate may be, for example, a support layer comprising a curable polymer, particularly a polymer with alkyne groups in the polymeric backbone or in the end groups of this polymer. In a further embodiment the substrate may be a template from which the layer of the cured crosslinking agent can be transferred to a target layer, particularly a polymeric target layer. By curing the crosslinking agent and the layer of the crosslinking agent respectively the at least three alkyne groups reconfigure to form a ladder network which provides a strong chemical bond between the molecules and—if applicable—the polymer of the support layer used as a substrate. Therefore, according to present invention a bilayered material is obtained comprising a thin, hard crust deposited on/transferred to a soft underlayer.

According to an embodiment of the first aspect of the present invention, the deposition of the crosslinking agent on the surface of the substrate is conducted by evaporation of the crosslinking agent from a source and a at least partial deposition on the surface of the substrate used as a target. By using this technique very thin layers of polymer can be deposited on a substrate; no dewetting phenomena during the process of curing can be observed (due to the instability of thin layers of a thickness of, for example, 5 nm). In contrast, using other deposition methods like spin-casting results in dewetting phenomena. Using a surfactant that lowers the surface energy of the substrate does not solve this problem; a dewetting of the spin-casted polymer cannot be avoided.

According to a further embodiment of the first aspect of the present invention the crosslinking agent is selected from compounds of the structure $ZR_3$ and/or $ZR'_4$. Z and Z' stands for a linking moiety, particularly an aromatic linker, linking the substituents containing the alkyne groups (Z has 3 substituents R and Z' has at least 4 substituents R, each of the substituents R containing at least one alkyne group; the substituents R are covalently bound to Z and Z', respectively).

For example Z may be a 1,3,5-substituted six membered aromatic ring or a 1,2,4-substituted six membered aromatic rings. Furthermore, the linking moiety may contain more than one aromatic ring. For example each of the at least two rings may contain at least two substituents R. For example Z' may contain 2 six membered aromatic rings which are connected via a single bond or an alkylene- or arylene-linker or an oxygen atom. Each of said 2 six membered aromatic rings of Z' for example may be a 3,5-substituted or a 3,4-substituted aromatic ring. Furthermore, three aromatic rings may be contained, each of these at least three rings with at least one substituent R containing at least one alkyne group.

Alternatively Z and Z' may be an aliphatic linking moiety, particularly a moiety which results in a desired special alignment substituents R (Z having 3 substituents R and Z' having 4 substituents R, each of the substituents R containing at least one alkyne group).

The substituent R of the crosslinking agent of the structure $ZR_3$ and/or $ZR'_4$ stands randomly and independently from one another for a moiety comprising at least one alkyne group and a substituted or unsubstituted aromatic moiety or a hydrogen atom or consists of an alkyne group and a substituted or unsubstituted aromatic moiety or a hydrogen atom.

Often all substituents R are identical; a structure of the crosslinking agent being less polar leads to a crosslinking agent being easier to evaporate.

Preferably the linking moiety Z or Z' represents

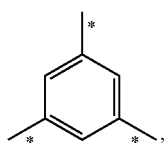, 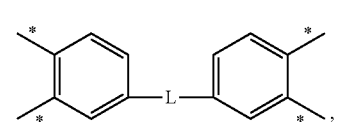,

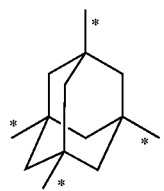

or a silicon atom
wherein * denotes a bond between R and Z or Z'.

The linker L between the two aromatic rings of the linking moiety preferably represents oxygen, an alkylene or arylene moiety. Alternatively L may be a single bond between the two aromatic rings. Preferably, alkylene linkers are methylene linkers or substituted methylene linkers like $C(CH_3)_2$.

Preferably the substituent R containing the at least one alkyne group stands randomly and independently from one another for a moiety comprising a substituted alkyne group (i.e. comprising no terminal alkyne), a meta- or para-substituted phenylene group and/or a phenyl group. Alternatively, R stands for a moiety consisting of a substituted alkyne group, a meta- or para-substituted phenylene moiety and/or a substituted or unsubstituted phenyl group. Unsubstituted phenyl groups are preferred; crosslinking agents containing substituted phenyl groups are less temperature stable. The substituent R may also contain two or more alkyne groups and two or more meta- or para-substituted phenylene moieties.

Most preferably the substituents R represent randomly and independently from one another

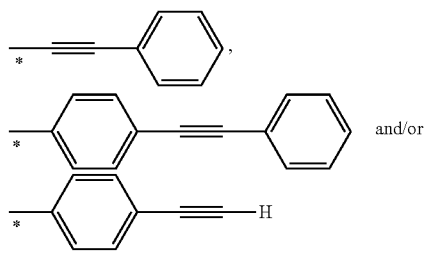

wherein * denotes a bond between R and Z or Z'.

The crosslinking agent $ZR_3$ and/or $ZR'_4$ represents most preferably:

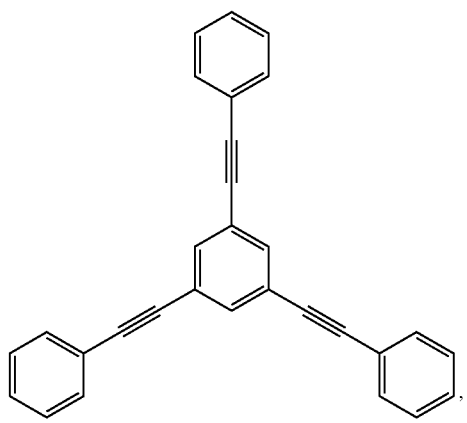

(I)

(II)

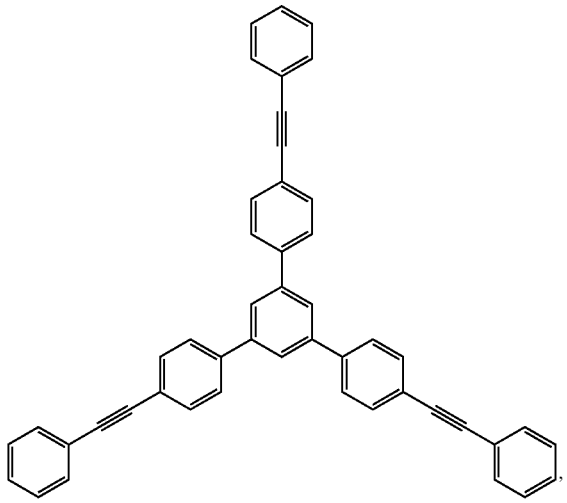

(III)

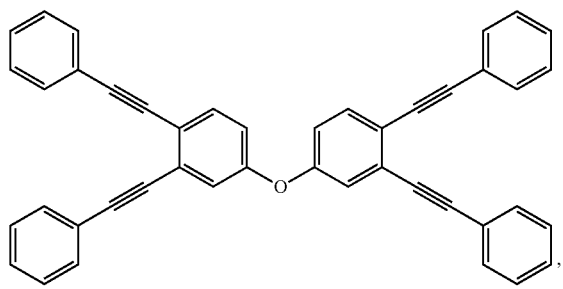

(IV)

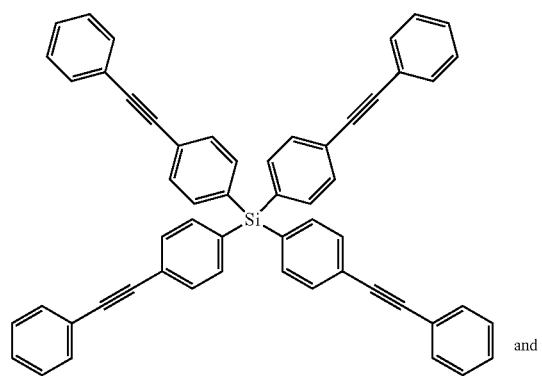

and (V)

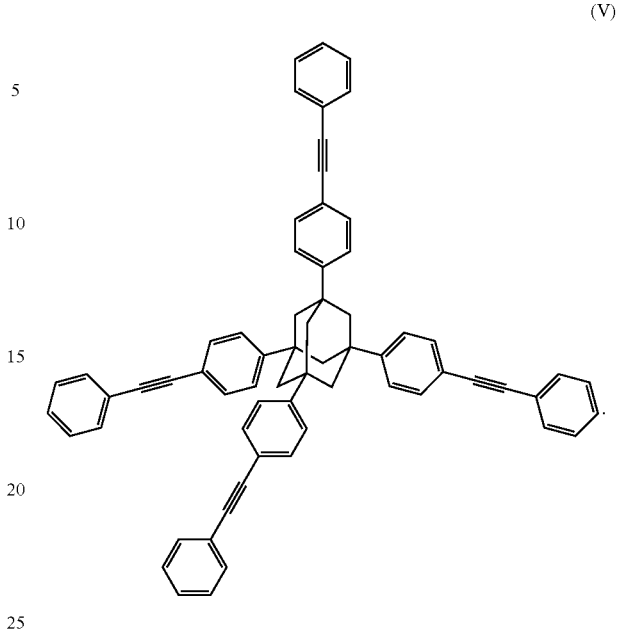

In a further embodiment the used crosslinking is vaporizable at temperatures below 300° C. At higher temperatures crosslinking agents containing alkyne groups often tend to polymerize. More preferably, the crosslinking agent is vaporizable at temperatures below 250° C. and most preferably at temperatures between 150 and 200° C. At these temperatures between 150 and 200° C. the ratio of the evaporated crosslinking agent enables a satisfying deposition rate.

In one example, the crosslinking agent according to embodiments of the present invention advantageously has a molecular weight of below about 900 Daltons (for the purpose of describing the present invention, Daltons and g/mol may be used interchangeably). More preferably the crosslinking agent has a molecular weight of between 270 and 800 Daltons.

In an embodiment of the present invention, the crosslink polymeric layer is deposited on the surface of a template. According to this embodiment after curing of the crosslinking agent the following steps are carried out:

(c) The modified surface of the substrate (i.e. the modified surface of the template) is contacted with a surface of a target layer. Thereby an assembly is obtained comprising the substrate with the crosslinked polymeric layer and the target layer adjacent to the modified surface. In step (d) a liquid is introduced to an environment of the assembly obtained in step (c). As a result the layer of the cured crosslinking agent is transferred onto at least an adjacent region on the target surface. The template surface is chosen on account of its surface roughness profile and is preferably relatively defect-free. The exposed surface of the cured crosslinking agent layer of the bilayered material (i.e. the layer of the data storage medium on top of the support layer) obtained in step (d) demonstrates the same degree of flatness as the template surface that it was previously in contact with. A method where a layer of a data storage medium is transferred from a template layer to a target layer is also described in WO 2007/113760, the disclosure content of which is hereby incorporated by reference.

In one example, the surface of the template used in this embodiment has a hydrophilic character. Desirably, the template surface comprises a surface of one of: a mica substrate, a flame-annealed glass substrate, a silicon-oxide layer on a silicon substrate and a (100) surface perovskite substrate. It is also preferable that heating of the modified surface produced in step (b) is conducted prior to step (c). It is desirable that the liquid introduced in step (d) comprises a polar liquid.

In a further example in this embodiment the cured layer of the crosslinking agent is obtained by deposition of a mixture of the crosslinking agent and a comonomer in step (a). In step (b) the mixture of deposited crosslinking agent and comonomer are cured, thereby producing the crosslinked polymeric layer.

As a comonomer, a compound bearing at least two alkyne groups can be used. Usually the comonomer exhibits a similar thermal stability compared to the crosslinking agent. For example, compounds of the general structure $Z''R_2$ ($Z''$ has 2 substituents R, each of the substituents R containing at least one alkyne group; the substituents R are covalently bound to $Z''$) can be used wherein R is defined as above (in compounds $ZR_3$ and $Z'R_4$). The central moiety $Z''$ stands for a moiety connecting two substituents R, for example, for an aromatic ring with two substituents R (for example in 1,3- or 1,4-position of a 6 member twin) or a biphenyl with two substituents R (for example in 4,4'-position). The ratio between the crosslinking agent and the comonomer is preferably between 100:0 and 20:80 (mol-%). Preferably the ratio of the comonomer is below 50 mol-%, more preferably below 20 mol-%.

The method according to this embodiment results in a bilayered material exhibiting sharp boundaries between the layers. The thin layer of the cured crosslinking agent is directly deposited onto a particular kind of surface from which it is possible to transfer the media onto a common target substrate. On top of the crosslinked layer for example a stable thick layer of a standard polymer can be spin-coated. The obtained sandwich of the cured crosslinking layer and standard polymer may be cured. Since the layer of the cured crosslinking agent is highly crosslinked and the molecular weight of the standard polymer is usually rather high, no significant interdiffusion of the layers is observed.

In a further embodiment of the present invention the crosslinking agent is deposited on the surface of a substrate which is a support layer comprising one or more crosslinkable polymers containing alkyne groups. These alkyne groups of the crosslinkable polymers may be contained in the polymeric back bone; alternatively the alkyne groups may also be contained in the end groups of the polymer. In this embodiment of the invention the deposited molecules of the crosslinking agent arrive at the surface of the support layer and enter the polymer via diffusion and find crosslinking partners. Thereby, they locally enhance the crosslinking density which leads to a bilayered material having no sharp boundaries between the layers; a data storage medium on top of the support layer is obtained.

In one example the support layer contains at least one polyaryletherketone polymer as described in US 2007/0296101 A1, which is incorporated hereby by reference. In another example the support layer comprises at least one polyimide oligomer as described in WO 2007/096359 A2 which is hereby incorporated by reference. Preferably each of said polyaryletherketone polymers and/or polyimide oligomers has two terminal ends each terminal end having two or more phenyl moieties. For example the following polyaryletherketone polymers described in US 2007/0296101 A1 may be used:

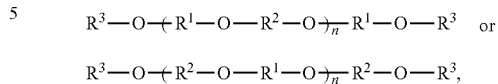

wherein $R^1$ is selected from the group consisting of:

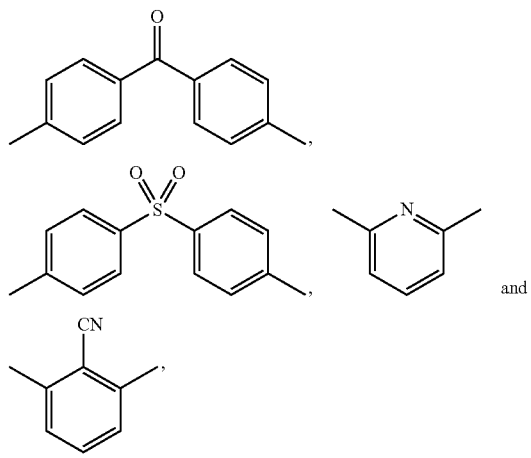

wherein $R^2$ is selected from the group consisting of:

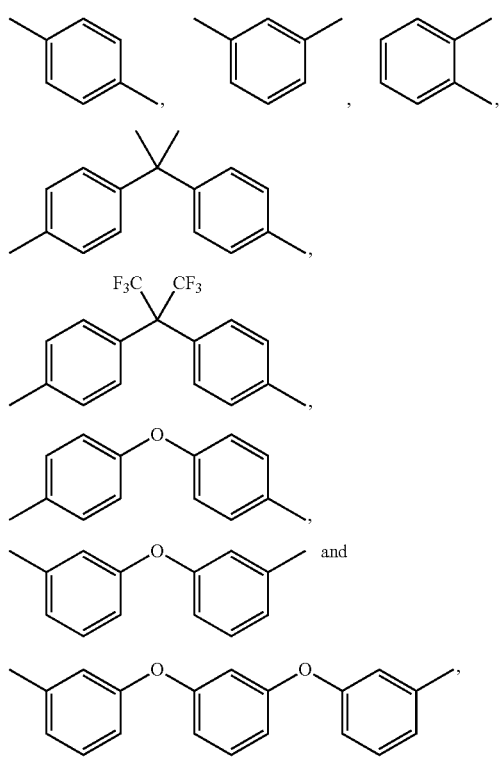

wherein $R^3$ is selected from the group consisting of poly (arylacetylenes), poly(phenylethynyls),

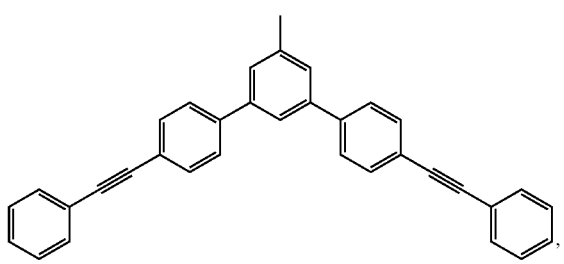

and

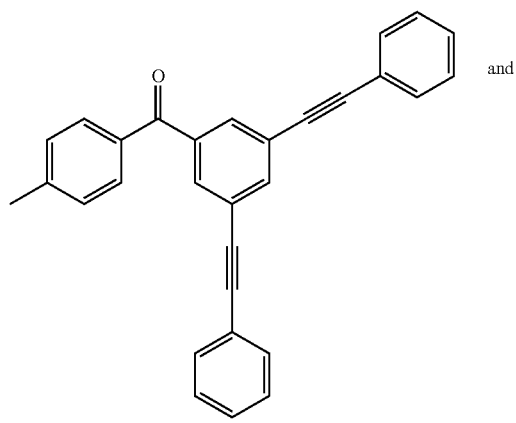

-continued

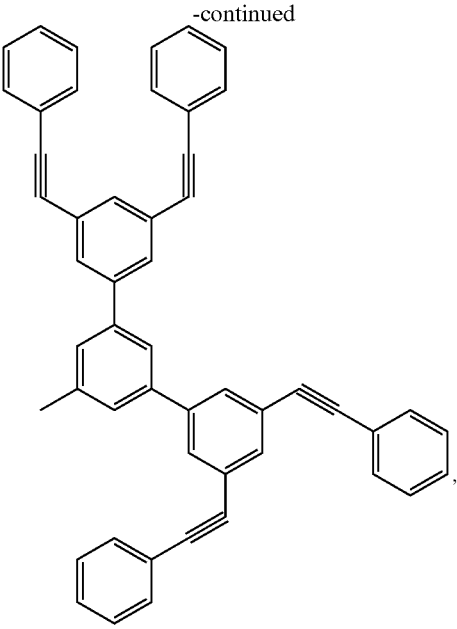

and
wherein n is a integer from about 5 to about 50.

In a further embodiment in the polyaryletherketone polymers described in US 2007/0296101 A1 0-30% of the number of $R^2$ moieties in

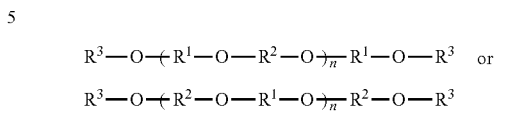

are replaced by the following moiety:

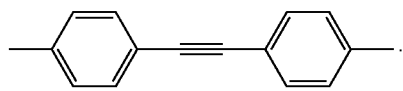

The synthesis of polyaryletherketone polymers containing these moiety is carried out as described in US 2007/0296101 A1 using a mixture of the starting materials for the $R^2$ moieties.

In a further example the support layer contains at least one polyimide oligomer. For example the following polyimide oligomers described in WO 2007/096359 A2 may be used:

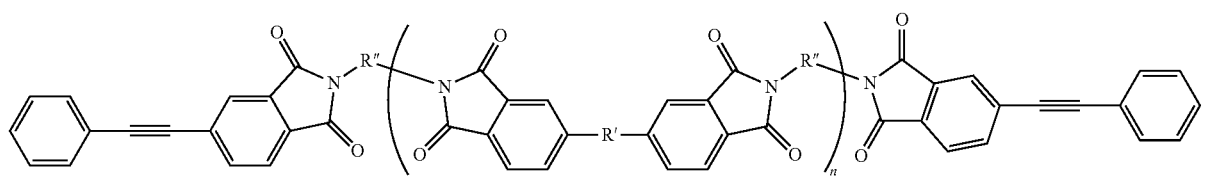

wherein R' is selected from the group consisting of:

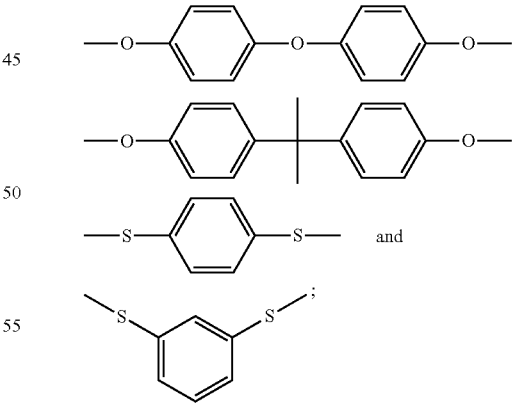

wherein R" is selected from the group consisting of:

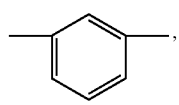

-continued

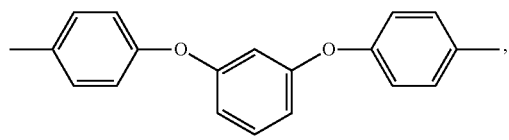

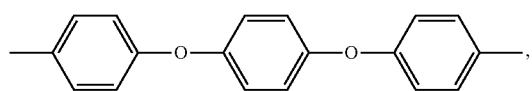

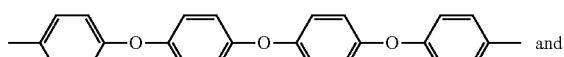

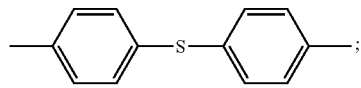

wherein n is a integer from about 5 to about 50.

As a further example the following polyimide oligomers described in WO 2007/096359 A2 may be used:

E-R'-(A$_1$-A$_2$-A$_3$- . . . -A$_N$)R''-R'-E wherein E is

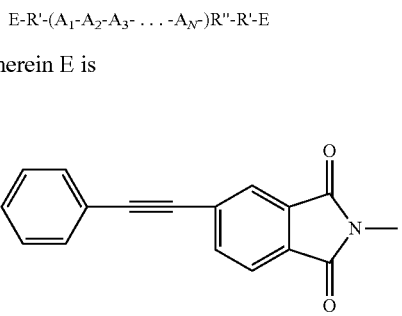

wherein each of A$_1$, A$_2$, A$_3$ . . . A$_N$ is independently selected from the group consisting of:

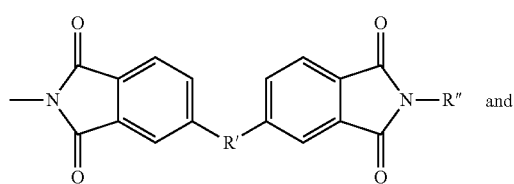

wherein R' and R'' are as defined above;

wherein R''' is

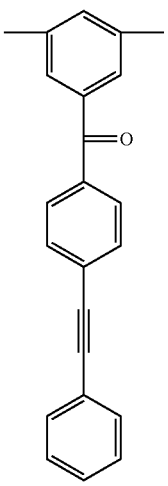

and wherein N is an integer greater than or equal to 2.

In an example the polymer contained in the support layer (in embodiments where the substrate is a template or a polymeric crosslinkable polymer respectively) has a high temperature stability and low glass transition temperature (TG). Preferably the glass transition temperature is less than 220° C., more preferably between 100° C. and 180° C., most preferably between 100° C. and 150° C. The glass transition temperature of the layer of the cured crosslinking agent is usually higher than the glass transition temperature of the polymer of the support layer. Preferably the difference between both glass transition temperatures is at least 50° C.

In a further embodiment the curing of the crosslinking agent is conducted at a temperature between 330° C. and 450° C., preferably between 350 and 450° C. and most preferably between 380° C. and 430° C. Usually steps (a) and (b) of the method of the present invention take place simultaneously.

As the evaporation of the crosslinking agent is carried out at a lower temperature than the temperature for the curing of the crosslinking agent also a re-evaporation of the already deposited crosslinking agent occurs at the surface of the substrate. However, altogether a growth of the layer of the cured crosslinking agent can be observed.

For the curing of the crosslinking agent further components may be present at the surface of the substrate or in the area of the substrate being adjacent to the surface (i.e. the support layer comprising polymers containing alkyne groups and the template from which the layer of the cured crosslinking agent can be transferred to a target layer, respectively). These further components include activators to start a polymerization reaction (e.g. radical starters and photoactivators) and molecules or compositions to facilitate processing (e.g. adhesion enhancers, antifoam agents and stabilizers).

In a further embodiment the thickness of the layer of the cured crosslinking agent is at least 5 nm. For use as a data storage medium usually a thickness of between 5 and 10 nm is sufficient.

The deposition of the crosslinking agent on the surface of the substrate can be carried out also by other techniques. Besides evaporation from a source and deposition on a target, techniques like plasma deposition can also be used. However, usage of plasma deposition may result in an uncontrolled nature of the crosslink reaction and difficulties in the control of the overall process.

According to a second aspect the present invention also extends to a data storage medium for storing data in the form of topographic features produced according to an embodiment of the method aspect of the present invention.

According to a third aspect the present invention extends to a data storage device incorporating a data storage medium according to the second aspect and further comprising at least one probe for writing and/or reading the data stored in the data storage medium.

In an embodiment of the invention, a local probe storage array is provided that includes a substrate, and a polymeric layer over the substrate, the polymeric layer comprising a crosslinking agent that has been cured, the crosslinking agent comprising at least three alkyne groups.

In another embodiment of the invention, a data storage device includes a local probe storage array including a substrate, and a polymeric layer over the substrate, the polymeric layer comprising a crosslinking agent that has been cured, the crosslinking agent comprising at least three alkyne groups, and a probe assembly disposed over the polymeric layer including a plurality of probe tip assemblies.

Features of one aspect of the present invention may be applied to any other aspect and vice versa.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1A:
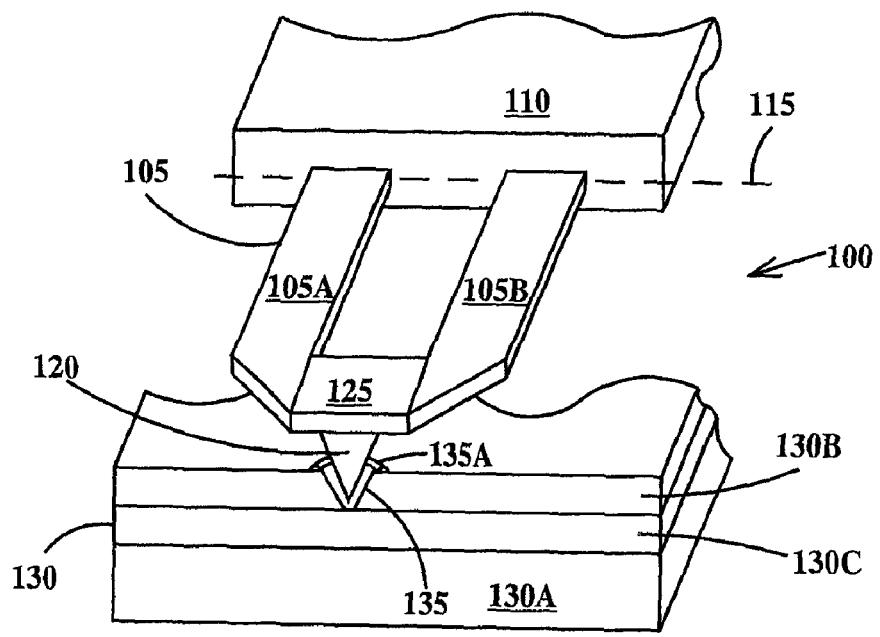
FIGS. 1A through 1C illustrate the structure and operation of a tip assembly for a data storage device including the data storage medium according to the embodiments of the present invention.
Figure 1B:
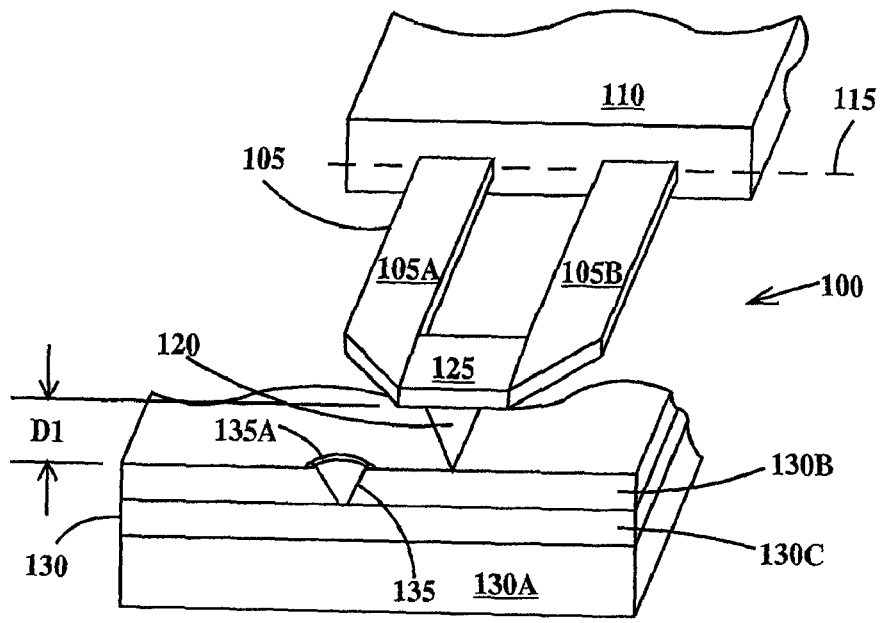
Figure 1C:
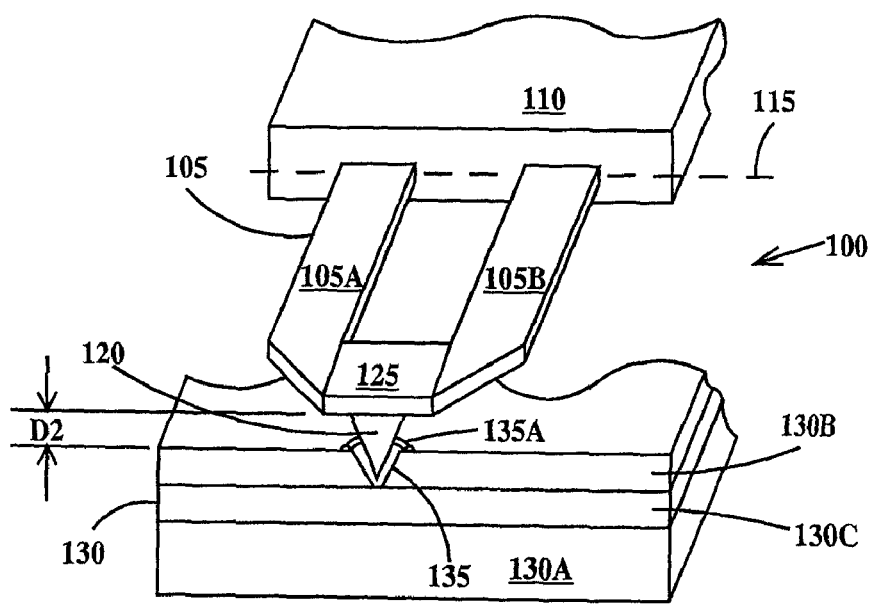

FIGS. 1A through 1C illustrate the structure and operation of a tip assembly 100 for a data storage device including the data storage medium according to the embodiments of the present invention. In FIG. 1A, probe tip assembly 100 includes a U-shaped cantilever 105 having flexible members 105A and 105B connected to a support structure 110. Flexing of members 105A and 105B provides for substantial pivotal motion of cantilever 105 about a pivot axis 115. Cantilever 105 includes an indenter tip 120 fixed to a heater 125 connected between flexing members 105A and 105B. Flexing members 105A and 105B and heater 125 are electrically conductive and connected to wires (not shown) in support structure 110. In one example, flexing members 105A and 105B and indenter tip 120 are formed of highly-doped silicon and have a low electrical resistance, and heater 125 is formed of lightly doped silicon having a high electrical resistance sufficient to heat indenter tip 120, in one example, to between about 100° C. and about 500° C. when current is passed through heater 125. The electrical resistance of heater 125 is a function of temperature.

Also illustrated in FIG. 1A is a storage medium (or a recording medium) 130 comprising a substrate 130A, and a support layer 130C. In one example, support layer 130C is a polyaryletherketone resin layer. In one example, support layer 130C has a thickness between about 10 nm and about 500 nm. On top of the support layer 130C a layer of the cured crosslinking agent 130B is shown.

Turning to the operation of tip assembly 100, in FIG. 1A, an indentation 135 is formed in cured crosslinking agent layer 130B by heating indenter tip 120 to a writing temperature TW by passing a current through cantilever 105 and pressing indenter tip 120 cured crosslinking agent layer 130B. Heating indenter tip 120 allows the tip to penetrate the cured crosslinking agent layer 130B forming indentation 135, which remains after the tip is removed. In a first example, the cured crosslinking agent layer 130B is heated by heated indenter tip 120, the temperature of the indenter tip being not greater than about 500° C., to form indentation 135. In a second example, the cured crosslinking agent layer 130B is heated by heated indenter tip 120, the temperature of the indenter tip being not greater than about 400° C., to form indentation 135. In a third example, the cured crosslinking agent layer 130B is heated by heated indenter tip 120, the temperature of the indenter tip being between about 200° C. and about 500° C., to form indentation 135. In a fourth example, the cured crosslinking agent layer 130B is heated by heated indenter tip 120, the temperature of the indenter tip being between about 100° C. and about 400° C., to form indentation 135. As indentations 135 are formed, a ring 135A of cured crosslinking agent is formed around the indentation. Indentation 135 represents a data bit value of "1", a data bit value of "0" being represented by an absence of an indentation. Indentations 135 are nano-scale indentations (several to several hundred nanometers in width).

FIGS. 1B and 1C illustrate reading the bit value. In FIGS. 1B and 1C, tip assembly 100 is scanned across a portion of cured crosslinking agent layer 130B. When indenter tip 120 is over a region of cured crosslinking agent layer 130B not containing an indentation, heater 125 is a distance D1 from the surface of the cured crosslinking agent layer 130B (see FIG. 1B). When indenter tip 120 is over a region of cured crosslinking agent layer 130B containing an indentation, heater 125 is a distance D2 from the surface of the cured crosslinking agent layer (see FIG. 1C) because the tip "falls" into the indentation. D1 is greater than D2. If heater 125 is at a temperature TR (read temperature), which is lower than TW (write temperature), there is more heat loss to substrate 130A when indenter tip 120 is in an indentation than when the tip is not. This can be measured as a change in resistance of the heater at constant current, thus "reading" the data bit value. It is advantageous to use a separate heater for reading, which is mechanically coupled to the tip but thermally isolated from the tip.

"Erasing" (not shown) is accomplished by positioning indenter tip 120 in close proximity to indentation 135, heating the tip to a temperature TE (erase temperature), and applying a loading force similar to writing, which causes the previously written indent to relax to a flat state whereas a new indent is written slightly displaced with respect to the erased indent. The cycle is repeated as needed for erasing a stream of bits whereby an indent always remains at the end of the erase track. TE is typically greater than TW. The erase pitch is typically on the order of the rim radius. In a first example, the cured crosslinking agent layer 130B is heated by heated indenter tip 120, the temperature of the indenter tip is not greater than about 500° C., and the erase pitch is 10 nm to eliminate indentation 135. In a second example, the cured crosslinking agent layer 130B is heated by heated indenter tip 120, the temperature of the indenter tip is not greater than about 400° C., and the erase pitch is 10 nm to eliminate indentation 135. In a third example, the cured crosslinking agent layer 130B is heated by heated indenter tip 120, the temperature of the indenter tip is between about 200° C. and about 400° C., and the erase pitch is 10 nm to eliminate indentation 135. In a fourth example, the cured crosslinking agent layer 130B is heated by heated indenter tip 120, the temperature of the indenter tip is between about 200° C. and about 500° C., and the erase pitch is 10 nm to eliminate indentation 135.

Figure 2:
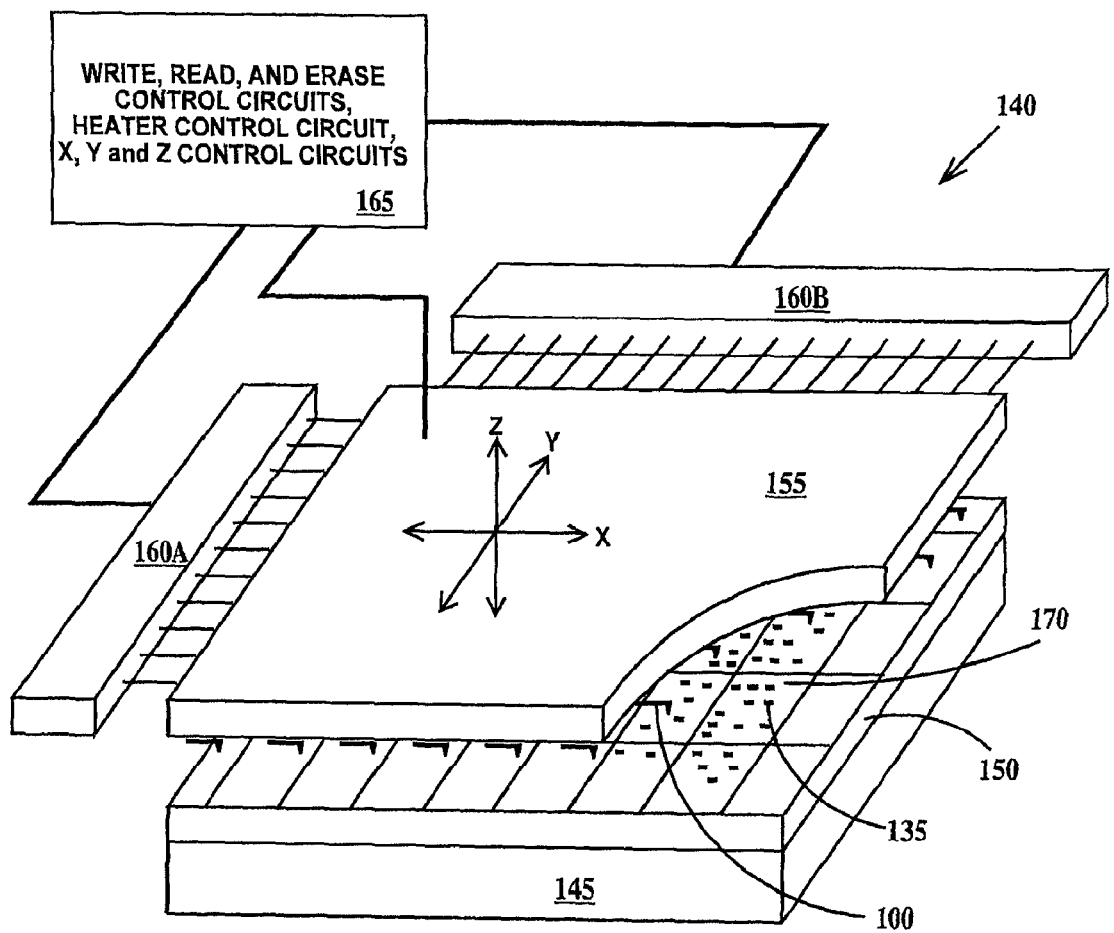
FIG. 2 is an isometric view of a local probe storage array including the data storage medium according to the embodiments of the present invention.

FIG. 2 is an isometric view of a local probe storage array 140 including the data storage medium according to the embodiments of the present invention. In FIG. 2, local probe storage array 140 includes substrate 145 having a polymeric support layer with a layer of the cured cross linking agent (not shown) on top of it (polymeric layer 150), which acts as the data-recording layer. In one example, polymeric layer 150 has a thickness between about 10 nm and about 500 nm and a root mean square surface roughness across a writeable region of polymeric layer 150 of less than about 1.0 nm across the polymeric layer 150. Positioned over polymeric layer 150 is a probe assembly 155 including an array of probe tip assemblies 100. Probe assembly 155 may be moved in the X, Y and Z directions relative to substrate 145 and polymeric layer 150 by any number of devices as is known in the art. Switching arrays 160A and 160B are connected to respective rows (X-direction) and columns (Y-direction) of probe tip assemblies 100 in order to allow addressing of individual probe tip assemblies. Switching arrays 160A and 160B are connected to a controller 165 which includes a write control circuit for independently writing data bits with each probe tip assembly 100, a read control circuit for independently reading data bits with each probe tip assembly 100, an erase control circuit for independently erasing data bits with each probe tip assembly 100, a heat control circuit for independently controlling each heater of each of the probe tip assembles 100, and X, Y and Z control circuits for controlling the X, Y and Z movement of probe assembly 155. The Z control circuit controls a contact mechanism (not shown) for contacting the cured polyaryletherketone resin layer 150 with the tips of the array of probe tip assemblies 100.

During a write operation, probe assembly 155 is brought into proximity to polymeric layer 150 and probe tip assemblies 100 are scanned relative to the polymeric layer 150. Local indentations 135 are formed as described supra. Each of the probe tip assemblies 100 writes only in a corresponding region 170 of polymeric layer 150. This reduces the amount of travel and thus time required for writing data.

During a read operation, probe assembly 155 is brought into proximity to polymeric layer 150 and probe tip assemblies 100 are scanned relative to the polymeric layer 150. Local indentations 135 are detected as described supra. Each of the probe tip assemblies 100 reads only in a corresponding region 170 of polymeric layer 150. This reduces the amount of travel and thus the time required for reading data.

During an erase operation, probe assembly 155 is brought into proximity to polymeric layer 150, and probe tip assemblies 100 are scanned relative to the polymeric layer 150. Local indentations 135 are erased as described supra. Each of the probe tip assemblies 100 reads only in a corresponding region 170 of cured polymeric layer 150. This reduces the amount of travel and thus time required for erasing data.

Additional details relating to data storage devices described supra may be found in the articles "The Millipede—More than one thousand tips for future AFM data storage," P. Vettiger et al., IBM Journal of Research and Development. Vol. 44 No. 3, May 2000 and "The Millipede—Nanotechnology Entering Data Storage," P. Vettiger et al., IEEE Transaction on Nanotechnology, Vol. 1, No, 1, March 2002. See also United States Patent Publication 2005/0047307, Published Mar. 3, 2005 to Frommer et al. and United States Patent Publication 2005/0050258, Published Mar. 3, 2005 to Frommer et al., both of which are hereby included by reference in their entireties.

Figure 3:
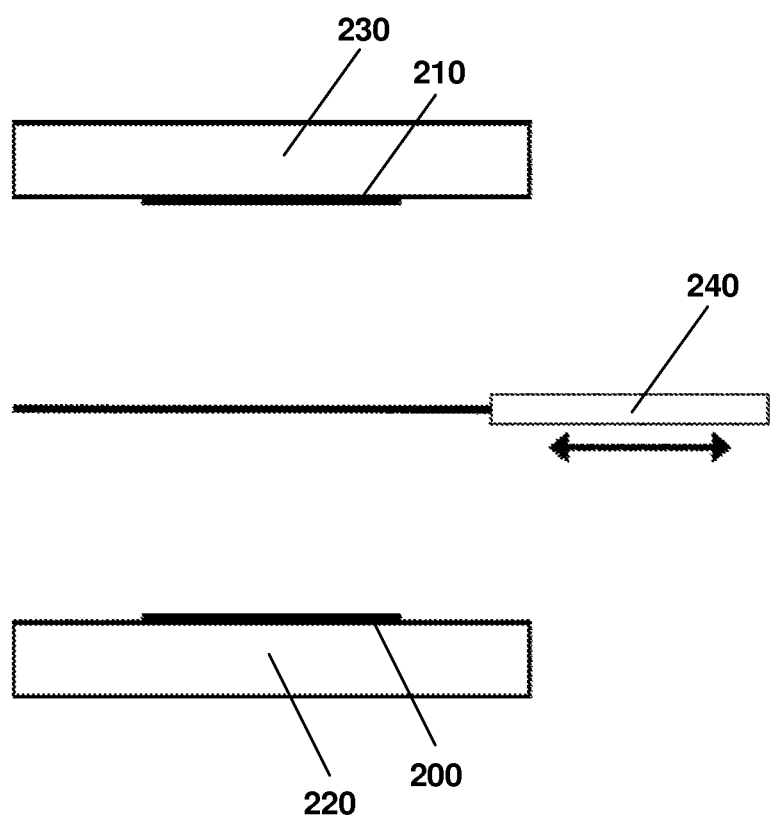
FIG. 3 shows schematically the setup for evaporation and deposition of the crosslinking agent.

FIG. 3 illustrates the evaporation set-up for the evaporation of the crosslinking agent. The set-up comprises two thermal conducting plates 220, 230 that can be heated separately up to 420° C. The plates are placed parallel to each other and separated, for example, by a distance of 4 cm. The source 200 of the evaporation process is clamped to the bottom plate 220. For this purpose a thin film of the crosslinking agent, for example the crosslinking agent 1,3,5-Tris(4-(phenylethynyl)phenyl)benzene (structure II) is spin-cast from the solution onto a silicon wafer. Facing the source 200, the target wafer 210 is attached to the top plate 230. A shutter 240 is placed between the two plates which can effectively initiate or stop the deposition of the source material onto the target. The set-up is placed in a high vacuum chamber (not shown).

The temperature calibration of the evaporation process was performed by keeping the target at room temperature. Before opening the shutter 240, the source temperature was raised to 120° C. in order to evaporate any absorbed molecules of water or other contaminants. It was found that efficient evaporation of the crosslinking agent, particularly of 1,3,5-Tris(4-(phenylethynyl)phenyl)benzene (structure II), is obtained at temperatures between 150° C. and 200° C. The average thickness of the film deposited on the target wafer after 10 minutes of evaporation was 23 nm as measured by ellipsometry.

In a second experiment, the target was maintained at 400° C. during the entire evaporation. The objective was to initiate the crosslinking reaction as soon as the crosslinking agent reaches the target. Because of this high temperature, a part of the molecules of the crosslinking agent re-evaporated from the target and a thinner film compared to the example before was obtained at the same evaporation conditions as in the first experiment. After 10 minutes of evaporation the thickness was 1.5 nm as measured by ellipsometry. A layer with a thickness of 5-10 nm was obtained after an evaporation time of 30 to 70 minutes.

In a third experiment a spin-cast film with a thickness of 134 nm (measured by ellipsometry) of a low crosslinked high temperature polymer served as a target (e.g. the polyaryletherketone polymer obtained from 4,4'-difluorobenzophenone, resorcinol and 3,5-bis(4-(phenylethynyl)-phenyl)phenol can be used—this polymer is described in US 2007/0296101 A1). After evaporation of the crosslinking agent, the overall thickness of the target was again 134 nm as measured by ellipsometry. However, a detailed analysis revealed a layered structure with a top layer having a thickness of 9 nm (measured by ellipsometry) comprising a cured mixture of 1,3,5-Tris(4-(phenylethynyl)phenyl)benzene (structure II) and substrate polymer (the target was maintained at 400° C. in this experiment). The existence of a cured mixture can be proven by ellipsometry: the measured value of the refractive index is between the values for pure cured crosslinking agent and pure cured low crosslinked polymer. Therefore this experiment shows that the crosslinking agent is free to diffuse and to react locally with the polymer, thereby increasing the crosslinked density. The hardness of the obtained media correlates with the crosslinked density.

Figure 4:
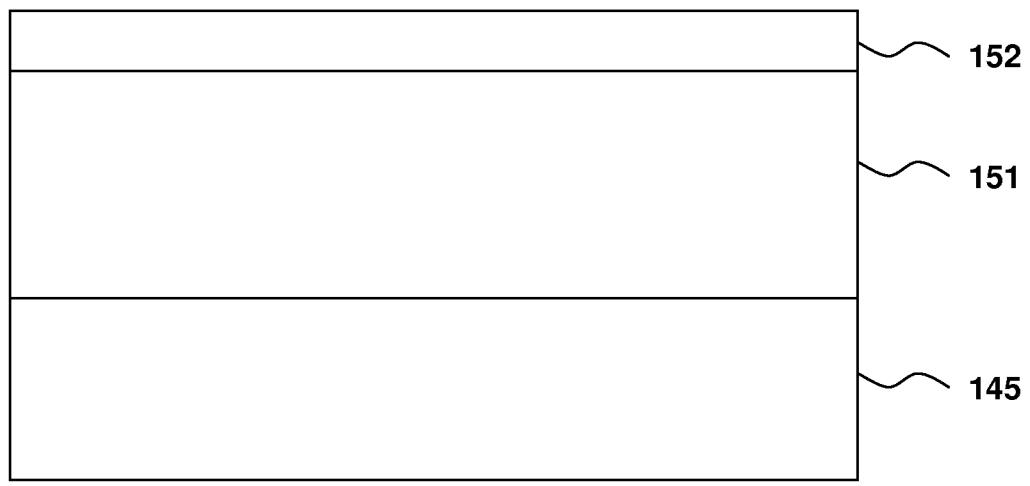
FIG. 4 shows an example of the data storage medium.

FIG. 4 shows an example of the data storage medium obtained by aforesaid experiments. This data storage medium comprises a substrate (145) made of silicon or another material and a not crosslinked or slightly crosslinked sublayer (151) for example a polyaryletherketone polymer layer (usually the fraction of crosslinked monomers in the backbone is <10%). The data storage medium further comprises a top layer (152) which is highly crosslinked and contains a cured crosslinking agent (for example 1,3,5-Tris(4-(phenylethynyl) phenyl)benzene). The thickness of the top layer is usually 5-10 nm.

Figure 5:
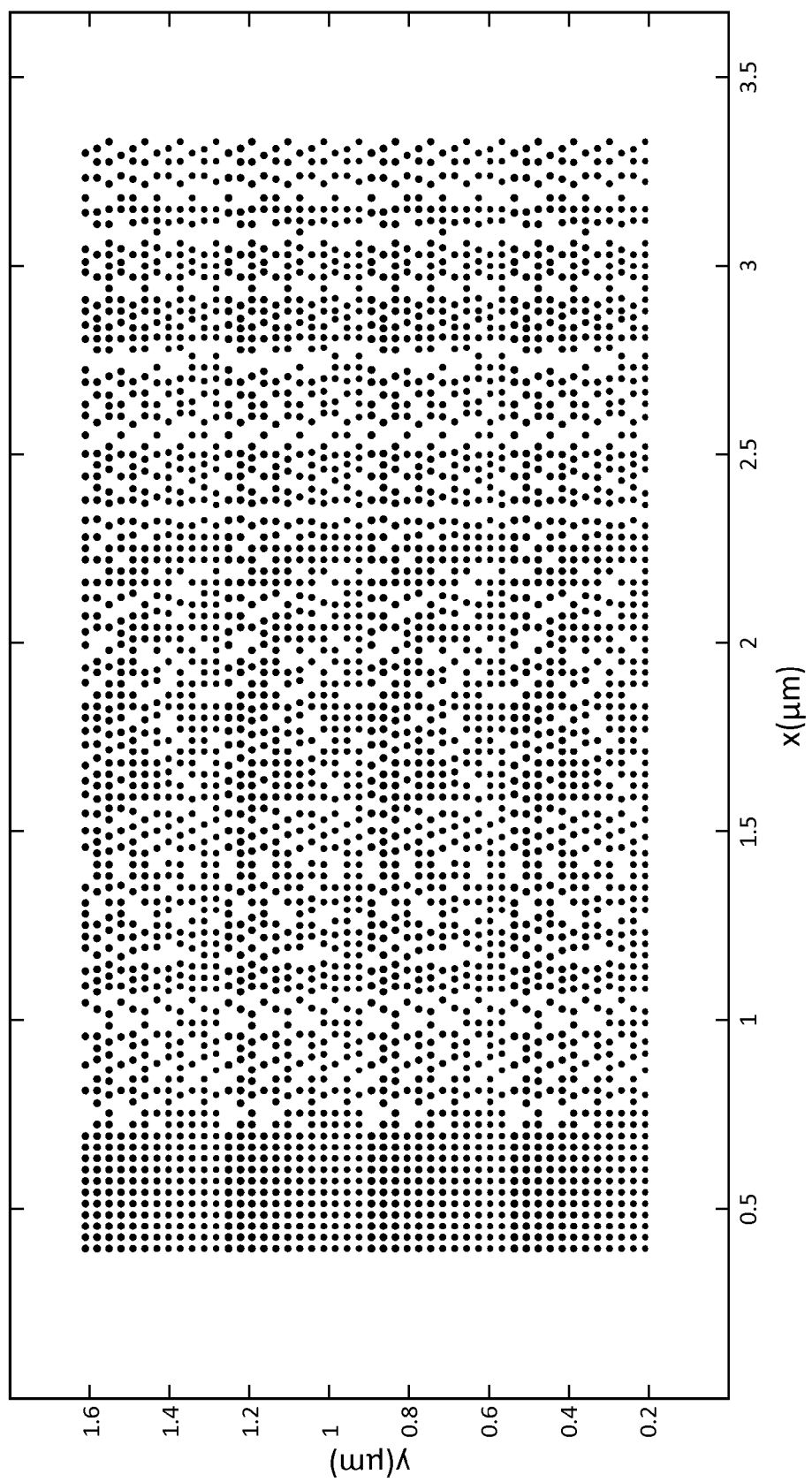
FIG. 5 and FIG. 6 show a grid of bits indented in a low crosslinked polymer and a low crosslinked polymer with a layer of a crosslinking agent deposited and cured on the surface of this polymer, respectively.
Figure 6:
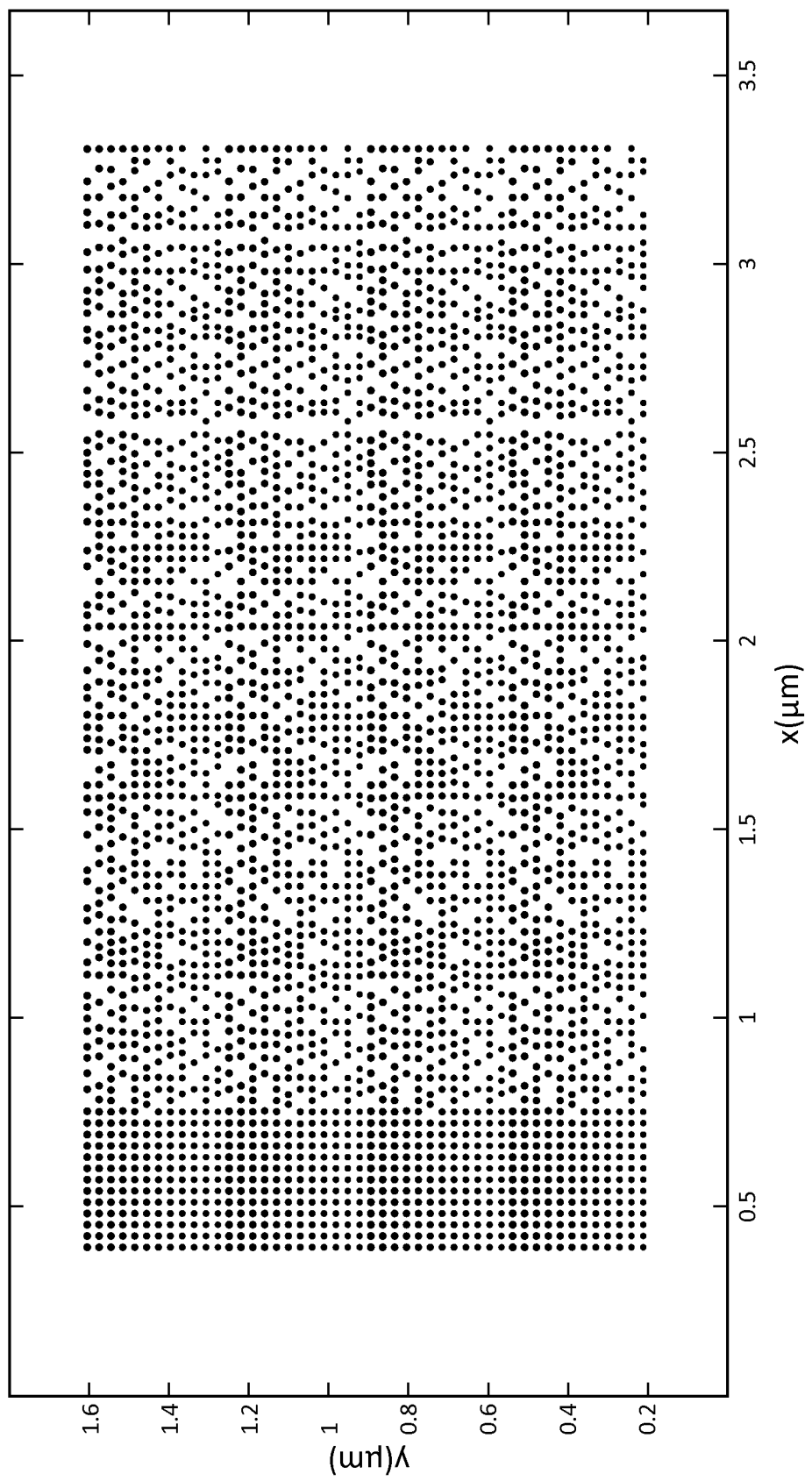

FIGS. 5 and 6 show a n array of bits which has been written onto the surface of a low crosslinked polymer (FIG. 5) and a layered structure obtained from a low crosslinked polymer with a layer of crosslinking agent deposited on top of it (FIG. 6), respectively.

The low crosslinked polymer shown in FIG. 5 is the polyaryletherketone polymer described in the preceding paragraph. The layered structure used for the written grid of bits shown in FIG. 5 is also described in the preceding paragraph.

For writing the grid of bits a millipede set-up was used. Each one of the four blocks in both figures was written at a different temperature, respectively from bottom to top, 100° C., 230° C., 367° C. and 500° C. Within each block, the force is increased after three lines, respectively, 85 nN, 105 nN, 125 nN and 145 nN.

Figure 7:
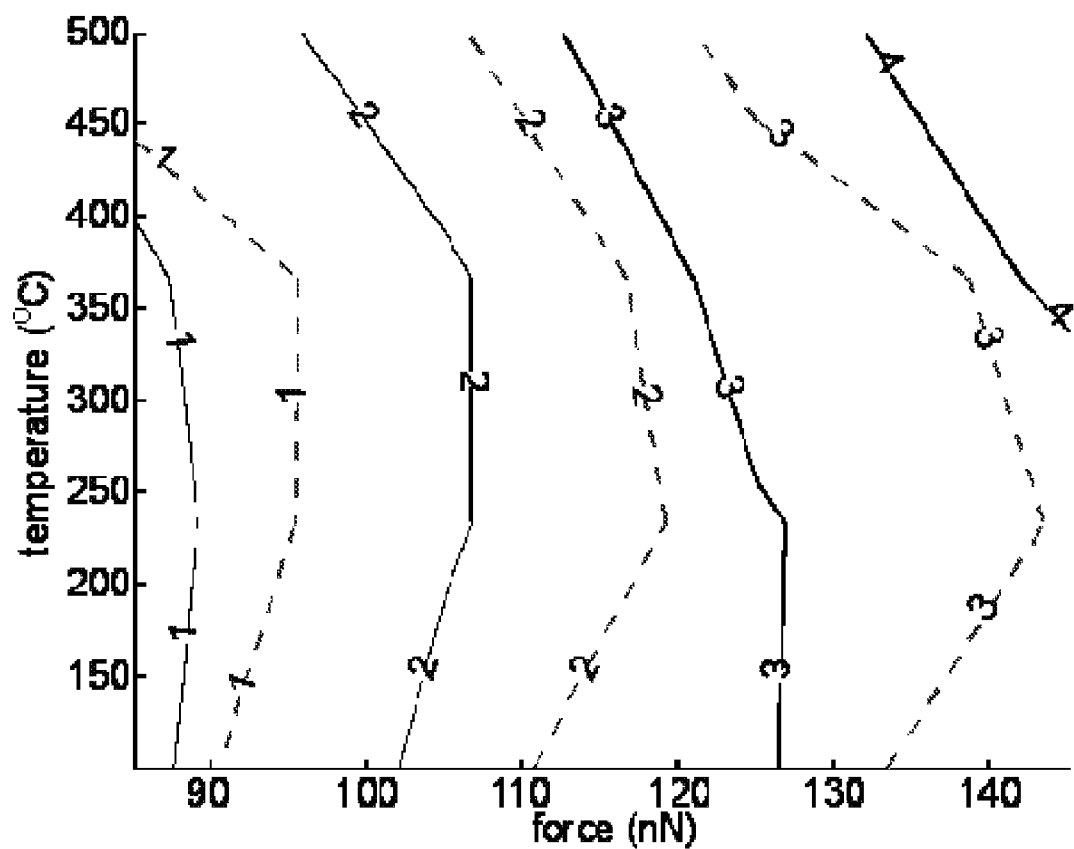
FIG. 7 shows the temperature-force relation for bits indented in a low crosslinked polymer with different depth.

FIG. 7 shows the temperature-force relation for bits with a given depth of 1 nm ("1"), 2 nm ("2"), 3 nm ("3") and 4 nm ("4") which have been written onto the surface of a low crosslinked polymer (continuos lines) and a layered structure obtained from a low crosslinked polymer with a layer of crosslinking agent deposited on top of it (dashed lines), respectively. The polymer/layered structure used for this experiment is identical to the polymer/layered structure described in the preceding paragraph.

The displacement of the curves towards higher forces for the samples having a top layer of cured crosslinking agent clearly indicates the increase of the hardness as expected. In fact, the increasing of crosslink sides locally reduced mobility of the polymer chains. Thus, the glass transition temperature increases and locally, a harder material is formed. By this method, it is expected to obtain media which exhibit a gradient of hardness from the top because the supply of crosslink agents is performed through a diffusion process. By changing the evaporation time, and eventually, the temperature of the target, one can obtain media with different diffusion lengths. In this way, it is possible to tune the properties of the media in order to optimize the writing conditions, the bit retention and the wear of the tip.

Synthesis of Polymers and Crosslinking Agents:

The crosslinking agents can be synthesized according to the exemplary synthesis described in U.S. Pat. No. 6,713,590 B2. Moreover, 1,3,5-tris[4-(phenylethynyl)phenyl]benzene can be synthesized according to S.V. Lindeman et al., Russian Chemical Bulletin C/C of Izvestiia-Akademiia Nauk Seriia Khimicheskaia 1994, 43, 1873 or according to Connor et al., Adv. Mater. 2004, 16, 1525.

Polyaryletherketone polymers are synthesized as described in US 2007/0296101 A1. Polyimide oligomers are synthesized as described in WO 2007/096359 A2.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A local probe storage array comprising:
   a substrate; and
   a polymeric layer over the substrate, the polymeric layer comprising a crosslinking agent that has been cured, the crosslinking agent comprising at least three alkyne groups.

2. The local probe storage array of claim 1, wherein the crosslinking agent has the structure $ZR_3$ and/or $Z'R4$, wherein Z and Z' has the relevance of an aromatic and/or an aliphatic linking moiety and R represents randomly and independently from one another a moiety comprising an alkyne group and a substituted or unsubstituted aromatic moiety and/or a hydrogen atom at the terminal carbon atom of the alkyne.

3. The local probe storage array of claim 2, wherein the linking moiety Z or Z' represents

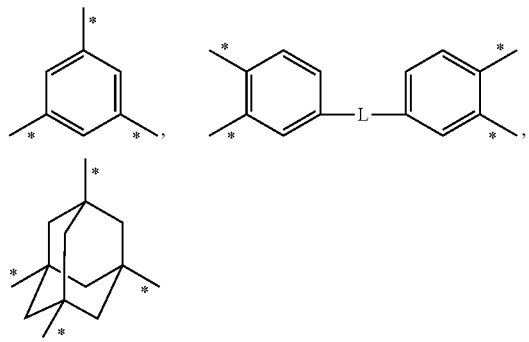

or a silicon atom;
wherein * denotes a bond between R and Z or Z' and
wherein L represent O, $CH_2$, $C(CH_3)_2$ an arylene moiety or a single bond between the two aromatic rings.

4. The local probe storage array of claim 2, wherein R represents randomly and independently from one another for a moiety comprising a substituted alkyne group, a meta- or para-substituted phenylene moiety and/or a phenyl group.

5. The local probe storage array of claim 4, wherein R represents randomly and independently from one another

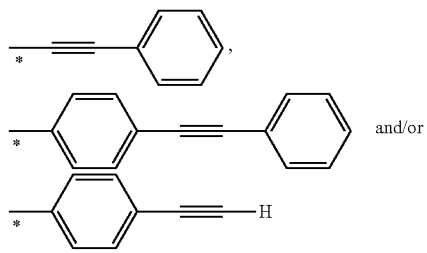

wherein * denotes a bond between R and Z or Z'.

6. The local probe storage array of claim 1, wherein the polymeric layer has a thickness between about 10 nm and about 500 nm.

7. The local probe storage array of claim 1, wherein the polymeric layer has a root mean square surface roughness across a writeable region of less than about 1.0 across the polymeric layer.

8. The local probe storage array of claim 1, further comprising a support layer between the substrate and the polymeric layer.

9. The local probe storage array of claim 8, wherein the support layer comprises one or more polyaryletherketone polymers and/or polyimide oligomers, each of said one or more polyaryletherketone polymers and/or polyimide oligomers having at least two terminal ends, each terminal end having two or more phenylethynyl moieties.

10. The local probe storage array of claim 1, wherein the substrate comprises a material selected from a group consisting of a mica substrate, a flame annealed glass substrate, a silicon oxide layer on a silicon substrate, and a (100) surface perovskite substrate salt layer.

11. A data storage device comprising:
a local probe storage array including:
a substrate, and
a polymeric layer over the substrate, the polymeric layer comprising a crosslinking agent that has been cured, the crosslinking agent comprising at least three alkyne groups; and
a probe assembly disposed over the polymeric layer including a plurality of probe tip assemblies.

12. The data storage device of claim 11, further comprising switching arrays connected to respective rows and columns of the plurality of probe tip assemblies.

13. The data storage device of claim 12, further comprising a controller coupled to the switching arrays, the controller independently writing data bits with each probe tip assembly, independently reading data bits with each probe tip assembly, and independently erasing data bits with each probe tip assembly.

14. The data storage device of claim 13, wherein the controller further controls each heater of each probe tip assembly.

15. The data storage device of claim 11, wherein the crosslinking agent has the structure $ZR_3$ and/or $Z'R4$, wherein Z and Z' has the relevance of an aromatic and/or an aliphatic linking moiety and R represents randomly and independently from one another a moiety comprising an alkyne group and a substituted or unsubstituted aromatic moiety and/or a hydrogen atom at the terminal carbon atom of the alkyne.

16. The data storage device of claim 15, wherein the linking moiety Z or Z' represents

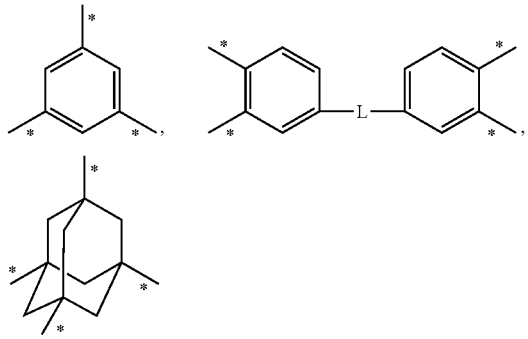

or a silicon atom;
wherein * denotes a bond between R and Z or Z' and
wherein L represent O, $CH_2$, $C(CH_3)_2$ an arylene moiety or a single bond between the two aromatic rings.

17. The data storage device of claim 15, wherein R represents randomly and independently from one another for a moiety comprising a substituted alkyne group, a meta- or para-substituted phenylene moiety and/or a phenyl group.

18. The data storage device of claim 17, wherein R represents randomly and independently from one another

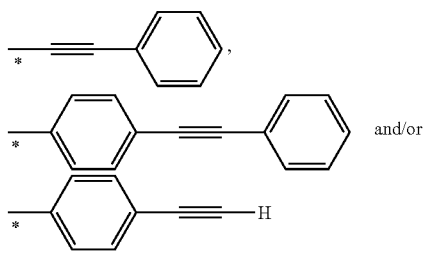

wherein * denotes a bond between R and Z or Z'.

19. The data storage device of claim 11, wherein the polymeric layer has a thickness between about 10 nm and about 500 nm.

20. The data storage device of claim 11, further comprising a support layer between the substrate and the polymeric layer.